United States Patent [19]

Greger

[11] 4,188,001
[45] Feb. 12, 1980

[54] LATCH MECHANISM

[75] Inventor: Anthony Greger, Rancho Palos Verdes, Calif.

[73] Assignee: The United States of America as represented by the Secretary of the Air Force, Washington, D.C.

[21] Appl. No.: 929,614

[22] Filed: Jul. 31, 1978

[51] Int. Cl.$^2$ .............................................. B64D 17/38
[52] U.S. Cl. ............................ 244/151 B; 24/230 A; 24/230 R; 24/206 B; 244/122 AE
[58] Field of Search ........ 244/122 R, 122 A, 122 AE, 244/122 AA, 137 R, 151 R, 151 A, 151 B; 24/230 A, 206 B, 134 R, 230 R

[56] References Cited

U.S. PATENT DOCUMENTS

| | | | |
|---|---|---|---|
| 2,989,274 | 6/1961 | Moran | 244/151 A |
| 3,569,903 | 3/1971 | Brishka | 24/230 R |
| 3,579,750 | 5/1971 | Carbon et al. | 24/230 A |
| 3,672,609 | 6/1972 | Hawkins | 244/122 AE |
| 3,865,333 | 2/1975 | Fielding et al. | 244/137 R |
| 3,954,234 | 5/1976 | Frost et al. | 244/151 A |

*Primary Examiner*—Galen L. Barefoot
*Attorney, Agent, or Firm*—Joseph E. Rusz; Arsen Tashjian

[57] ABSTRACT

A latch for use on an aircraft ejection seat and the like to permit the optional selection, prior to ejection, as to retention of a survival kit. The latch includes a housing for receiving a bolt which is retained in position by a detent spring, and a two-position toggle having a lever extending therefrom and maintained in position by a toggle detent. In one position, the toggle retains the bolt fixed in the housing and a lanyard passing through a hole in the bolt has one end attached to the survival kit and the other end to the ejection seat through a cord cutter. In this position the cutter is activated and the survival kit separates from the seat structure. With the toggle in the other position, the bolt slips out of the detent spring upon ejection and the lanyard with the bolt attached secures the survival kit to the ejection seat.

2 Claims, 3 Drawing Figures

U.S. Patent
Feb. 12, 1980
4,188,001
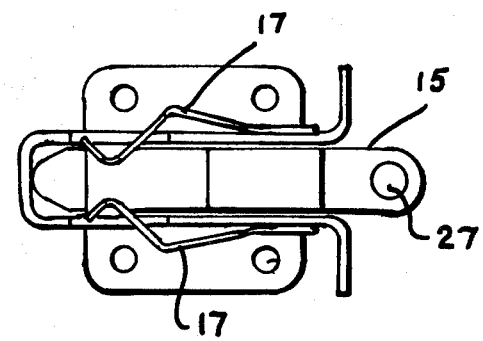
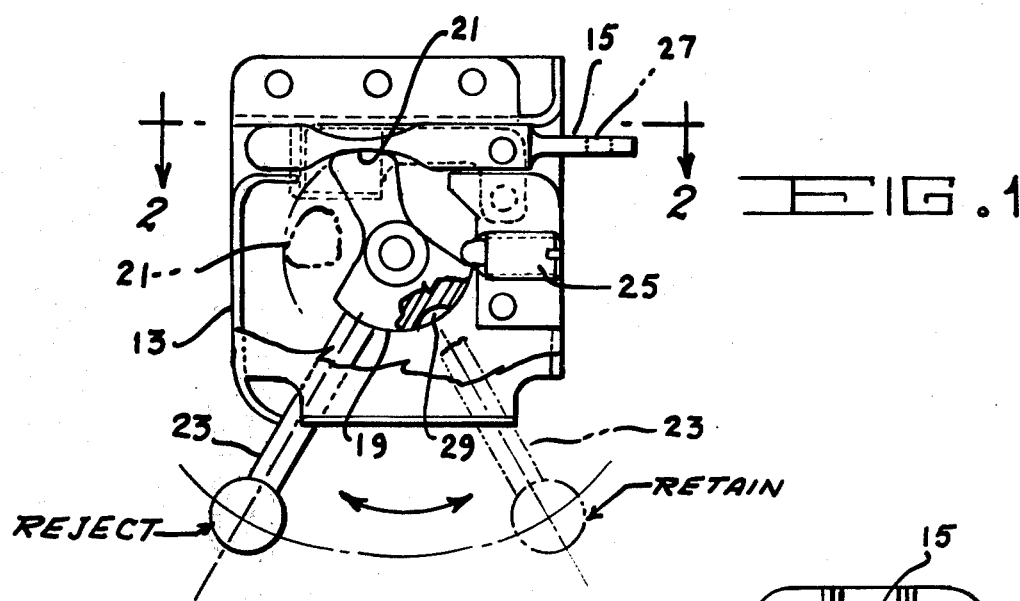
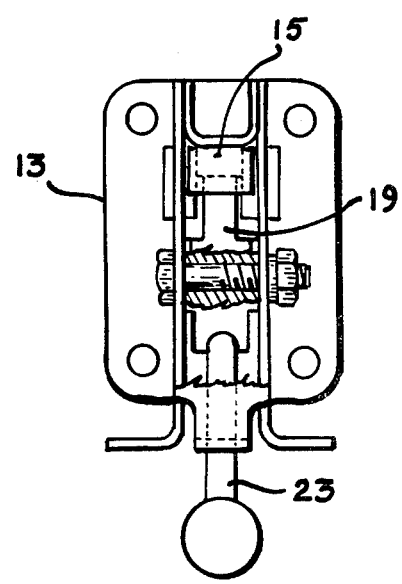

LATCH MECHANISM

STATEMENT OF GOVERNMENT INTEREST

The invention described herein may be manufactured and used by or for the Government for governmental purposes without the payment of any royalty thereon.

BACKGROUND OF THE INVENTION

This invention relates to an improved selective latch assembly suitable for ejection seat survival kit deployment actuation and, more particularly, the invention is concerned with providing a latch wherein the occupant of the ejection seat makes an election prior to ejection as to retention of the survival kit.

Previously used latches were not satisfactory for the purpose intended. Many times the lanyard terminal would separate when the latch assembly was being actuated from one position to the other causing serious difficulties to the seat occupant. Thus, a reliable system for installing the lanyard terminal and latching it at all times would be most desirable. Also, a position indication that the lanyard terminal is latched or unlatched (disengaged) would be an advantage.

SUMMARY OF THE INVENTION

The present invention is concerned with providing an actuation limiting latch wherein a housing contains a toggle which rotates about a pivot point from latched to unlatched position. A bolt maintains the toggle in its latched position. When the bolt is out of its pocket, bolt detent springs snap into place, thereby preventing toggle rotation into latched position, thus indicating bolt is disengaged from latching. When the bolt is inserted, it forces the bolt detent springs out of the bolt pocket, thus allowing the toggle to swing into the latched position and retaining the bolt in its place. An added feature is an adjustable toggle detent for locking the toggle in the latched or unlatched position by using a spring loaded plunger.

Accordingly, it is an object of the invention to provide a latch mechanism for ejection seat survival kit deployment actuation wherein a positive indication of latched or unlatched condition is achieved and wherein latching bolt disengagement under vibration and light loads is resisted.

Another object of the invention is to provide a latch mechanism wherein the level load is adjustable and a load-aiding capability with increase of pull-out load is included.

Still another object of this invention is to provide a latch mechanism wherein the lanyard terminal is retained in the automatic deployment mode and released in the manual deployment mode.

A further object of the invention is to provide a latch mechanism for use on an aircraft ejection seat which is not sensitive to orientation and can be universally mounted on the aircraft.

A still further object of the invention is to provide a latch mechanism which includes an automatic block-out device in the form of detent springs which prevents the latching function when the mating latch component half (bolt) is not in its position.

Another still further object of the invention is to provide a latching mechanism wherein the prevention of latching mechanism actuation automatically indicates that latching is not achieved and corrective action is to be taken.

These and other objects, features and advantages will become more apparent after considering the following description taken in conjunction with the annexed drawings and appended claims.

BRIEF DESCRIPTION OF THE DRAWINGS

FIG. 1 is a side view of the latch mechanism according to the invention partially broken away to show some detail of toggle in the latched position. Toggle is partially shown in phantom in the unlatched position.

FIG. 2 is a top view of the bolt mechanism taken along the line 2—2 of FIG. 1; and FIG. 3 is an end view of the latch mechanism showing the toggle in the latched position in full engagement with the bolt.

DESCRIPTION OF A PREFERRED EMBODIMENT

Referring now to the Figures wherein like reference numerals refer to like elements in the several views, FIG. 1 shows the latch for use in an ejection seat assembly to allow the seat occupant to make an election prior to ejection as to retention of a survival kit or the like. The latch includes a housing 13 for retaining the various elements of the mechanism. A bolt 15 is slidably positioned in the housing 13 and is retained in place by the detent springs 17. The latch is provided with a two-position toggle 19 which includes a cam surface 21 for engaging a corresponding cam surface on the bolt 15. A lever 23 is provided for positioning the toggle 19 and a spring loaded toggle detent 25 serves to maintain the toggle 19 in position after setting.

In one position of the lever 23, shown solid, the toggle 19 retains the bolt 15 in the housing 13. A lanyard (not shown) passes through the hole 27 in the bolt 15 and one end of the lanyard attaches to a survival kit or some other object on the aircraft. The other end of the lanyard attaches to the ejection seat structure through a cord cutter. With the bolt 15 in the fixed position, at separation, the cord cutter is actuated and the survival kit separates from the seat structure. With the toggle 19 in the alternate position, shown in phantom, the bolt 15 slips out of the detent springs 17 upon separation and the lanyard with the bolt 15 attached, secures the survival kit to the seat pack on the ejection seat. The toggle 19 is held in the alternate position by the toggle detent 25 which engages an indentation 29 on the toggle 19.

Although the invention has been illustrated in the accompanying drawings and described in the foregoing specification in terms of a preferred embodiment thereof, the invention is not limited to this embodiment. It will be apparent to those skilled in the art that the hereinbefore described latch mechanism is usable in a wide field of other industrial applications and that certain changes, modifications and substitutions can be made therein, particularly with regard to the construction details, without departing from the true spirit and scope of the appended claims.

Having thus set forth the nature of my invention, what I claim and desire to secure by Letters Patent of the United States is:

1. A latch mechanism for use on an aircraft ejection seat and the like to permit the optional rejection and retention of an attached package, comprising, a housing, a bolt slidably positioned in said housing, said bolt having a cam surface on the side thereof, a pair of detent springs in contact with said bolt for retaining said bolt in position in said housing, a two-position toggle pivotably mounted in said housing for rotation in the central area thereof, a cam surface on said toggle for engaging the cam surface on said bolt when said latch is in the rejection mode, and a lever extending radially outward from said toggle to permit selective rotation of the toggle to disengage the cam from said bolt placing said latch in the retention mode and allowing said bolt to slide out of said housing thereby causing the attached package to eject with the ejection seat.

2. The latch mechanism permitting optional rejection and retention of an attached package as defined in claim 1 wherein a spring loaded toggle detent is positioned for sliding radial movement in said housing, the inner end of said toggle detent engaging an indentation in said toggle thereby maintaining said toggle in the retention mode after setting the toggle lever.

* * * * *